United States Patent [19]

Deminski

[11] 4,338,037

[45] Jul. 6, 1982

[54] MULTIPLE JACKSCREW ROD TO CROSSHEAD MOUNTING

[75] Inventor: Richard M. Deminski, Mt. Vernon, Ohio

[73] Assignee: The Yorde Machine Products Company, Nelsonville, Ohio

[21] Appl. No.: 176,490

[22] Filed: Aug. 8, 1980

[51] Int. Cl.³ ............................................... F16D 1/00
[52] U.S. Cl. ..................................... 403/24; 403/320; 403/343; 308/3 CH
[58] Field of Search ............ 411/226, 231; 308/3 CH; 403/320, 343, 24, 16, 11; 254/29 A; 29/452

[56] References Cited

U.S. PATENT DOCUMENTS

| | | | |
|---|---|---|---|
| 1,348,287 | 8/1920 | McArthur | 308/3 CH |
| 1,524,554 | 1/1925 | Keen | 308/3 CH |
| 2,835,518 | 5/1958 | Naab | 403/16 |
| 3,704,904 | 12/1972 | Rizzone | 403/24 |
| 3,749,362 | 7/1973 | O'Connor et al. | 254/29 A |

Primary Examiner—Andrew V. Kundrat
Attorney, Agent, or Firm—Frost & Jacobs

[57] ABSTRACT

A piston rod to crosshead mounting for use in reciprocating compressors having a crosshead nut bearing a plurality of diametrically opposed threaded jackscrews each having a bearing pad cooperating with the adjacent crosshead mounting boss face. The bearing pads are swivelably mounted to the jackscrew to permit the bearing pad to adjust to any out-of-squareness of the crosshead mounting surface. The construction permits the bearing pads to operate independently of each other while applying full preload to the piston rod.

12 Claims, 3 Drawing Figures

MULTIPLE JACKSCREW ROD TO CROSSHEAD MOUNTING

SUMMARY OF THE INVENTION

Many conventional reciprocating compressors use the conventional compressor piston rod to crosshead mounting arrangement illustrated in FIG. 1. In such a construction, the threaded end of a piston rod 1 threadedly engages a cooperating bore 2 in the crosshead 3. A crosshead nut 4 which threadedly engages the threaded portion of the piston rod is then tightened against the crosshead to lock the piston rod to the crosshead.

It is well-known that the crosshead nut must be tightened against the crosshead with a high value of torque to insure that the piston rod is prestressed in tension. In some situations such high values of torque are difficult to obtain with a single nut design. Moreover, these high torque loads frequently result in galling of both the nut and crosshead bearing surfaces with subsequent loss of nut to crosshead squareness as illustrated at A in FIG. 1. Conversely, out-of-squareness may lead to galling of the bearing surfaces. These conditions can result in excessive rod deflections which in turn can cause rod failures, packing leakage and wear, cylinder bore scuffing, and loss of piston rod to crosshead tightness.

The rod to crosshead mounting of the present invention seeks to overcome these problems by providing means in spite of any out-of-squareness of the crosshead boss face. In a preferred embodiment, the invention includes a conventional generally cylindrical elongated piston rod having a threaded end, and a crosshead having a threaded central bore for threadedly engaging the threaded end of the piston rod. The crosshead also includes a substantially flat surfaced mounting face surrounding the bore.

A specially designed crosshead nut threadedly engages the threaded end of the rod such that the inner face of the nut is slightly spaced from the crosshead mounting boss face. The nut includes a plurality of threaded diametrically opposed bores spaced from and surrounding the centrally located threaded through bore. A counterbore is positioned coaxially with each of the threaded bores adjacent the inner face of the nut.

A jackscrew threadedly engages each of the diametrically opposed crosshead nut bores, and includes a nut-like cap positioned on one end adjacent the crosshead nut outer surface for tightening the jackscrew to a predetermined torque value, and a rounded convex surface on the other end which swivelably cooperates with a matching rounded concave depression in a generally cylindrical bearing pad secured within the coaxial counterbore. The opposite surface of the bearing pad has a flat surface configured to seat against the crosshead boss face so that the pad is free to adjust itself within the counterbore to any out-of-squareness of the crosshead boss face. The bearing pad is secured within the counterbore by means of a groove circumferentially inscribed around the outer edge of the bearing pad and a resilient ring secured within the groove such that the outer edge of the ring is in contact with the inner wall of the counterbore.

As will be explained in more detail hereinafter, this construction permits the bearing pads to operate independently of each other while applying full preload to the piston rod. This arrangement permits the use of standard socket-type torque wrenches, which can be a significant advantage when working in cramped spaces between adjacent compressor cylinders. Furthermore, the multiple jackscrew mounting is adaptable for most conventional crossheads having an adequate boss mounting surface under the existing hex crosshead nut. Finally, the preload stress may be precisely controlled because of the size of the individual jackscrews, which can be very critical in the highly stressed areas of piston and rod assemblies.

Further features of the invention will becomed apparent from the detailed description which follows.

DETAILED DESCRIPTION

Figure 2:
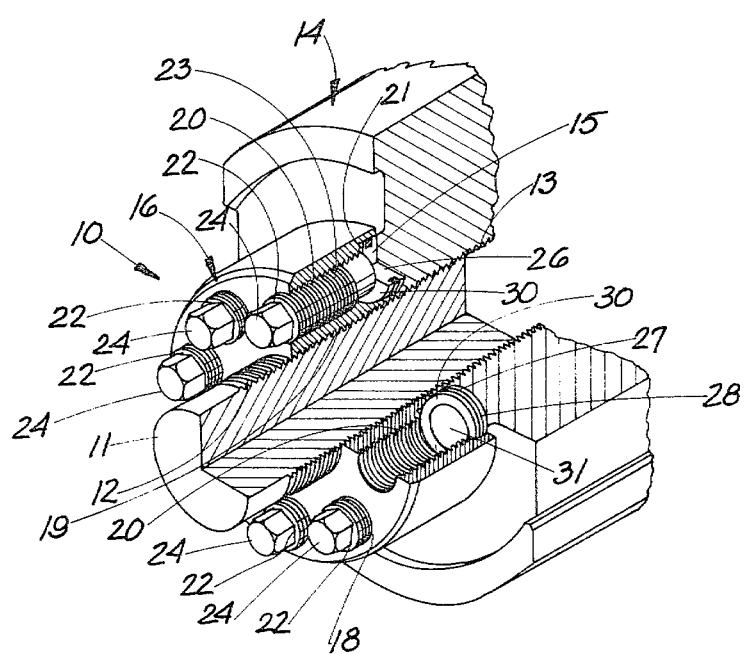
FIG. 2 is a fragmentary partially cross-sectioned front perspective view of the multiple jackscrew rod to crosshead mounting of the present invention.

The multiple jackscrew rod to crosshead mounting of the present invention is illustrated generally at 10 in FIG. 2. The mounting includes a generally cylindrical elongated piston rod 11 having one end opposite the piston threaded as at 12. As is well known in the art, the threaded end 12 of the piston rod normally engages a threaded bore 13 in a crosshead, shown generally 14. Crosshead 14 also includes a generally circular substantially flat surface mounting boss face 15 surrounding bore 13.

Figure 1:
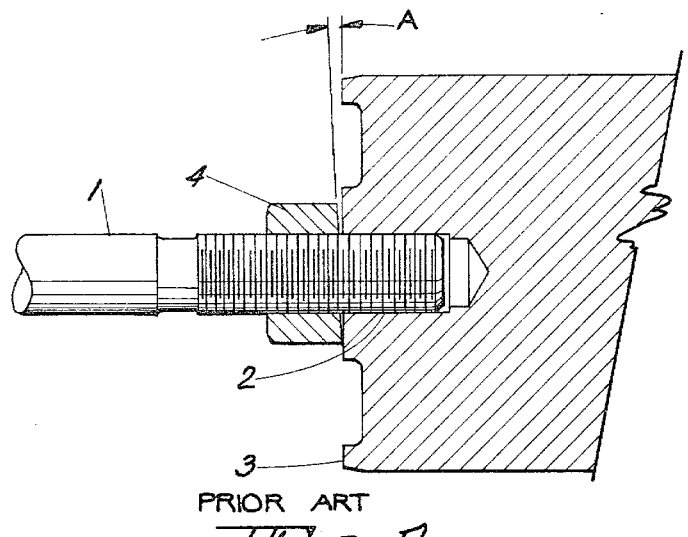
FIG. 1 is a fragmentary cross-sectional view of a typical prior art piston rod and crosshead mounting arrangement.
Figure 3:
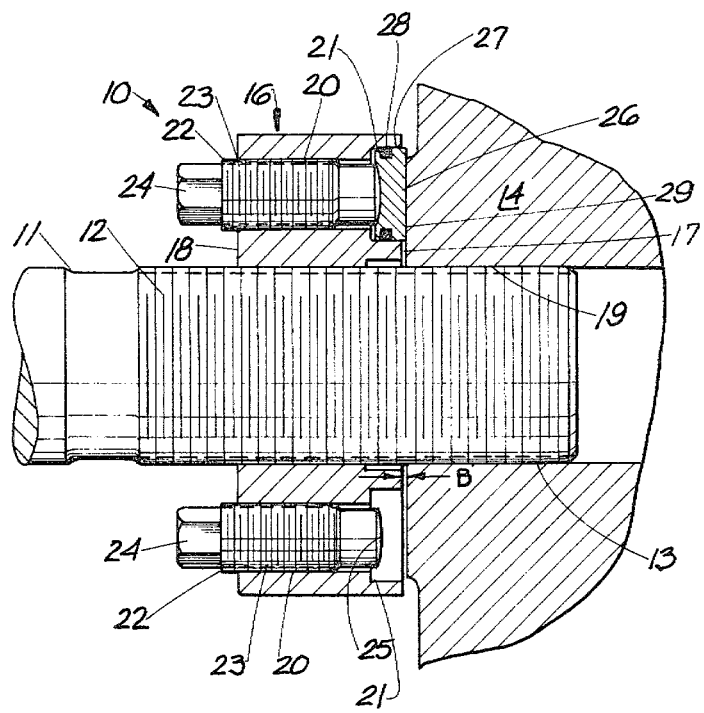
FIG. 3 is a fragmentary cross-sectional view of the multiple jackscrew rod to crosshead mounting of FIG. 2.

The conventional crosshead nut 4 illustrated in the prior art mounting of FIG. 1 is replaced with a multiple jackscrew crosshead locking nut illustrated generally at 16 in FIG. 2 and FIG. 3. Crosshead nut 16 is generally cylindrical in configuration and includes spaced smoothly surfaced inner and outer faces 17 and 18, respectively. Crosshead nut 16 is provided with a centrally located threaded rod accepting through bore 19 which threadedly engages the threaded end 12 of piston rod 11 such that the inner face 17 of the crosshead nut is slightly spaced from mounting boss face 15, as best shown in FIG. 3.

Crosshead nut 16 is also provided with a plurality of threaded diametrically opposed jackscrew accepting bores 20 equally spaced from and surrounding centrally located through bore 19. A generally cylindrical counterbore 21 is positioned adjacent inner face 17 coaxially with jackscrew accepting bore 20. In general, counterbore 21 will also be of the slightly greater diameter than jackscrew accepting bore 20.

Each jackscrew accepting bore 20 is provided with a generally cylindrical jackscrew 22 which includes a threaded central shank portion 23 which threadedly engages the associated jackscrew accepting bore 20. The outer end of each jackscrew 22 is provided with a hex nut-like cap 24 for tightening the jackscrew to a predetermined torque value as will be described in more detail hereinafter. The opposite end of jackscrew 22 positioned within counterbore 21 is provided with a smoothly finished convex rounded bearing surface 25 as best shown in FIG. 3, where the lower bearing pad has been removed for clarity.

A generally cylindrical flat washer-like bearing pad 26 is secured within counterbore 21 by means of a groove 27 circumferentially inscribed around the outer edge of bearing pad 26, and a resilient ring 28, such as an elastomeric O-ring or the like, secured within groove 27 such that the outer edge of ring 28 is in contact with the inner wall of counterbore 21. It will be observed that this construction permits bearing pad 26 to remain in place as jackscrew 22 is withdrawn.

The rearmost surface 29 of bearing pad 26 is substantially smooth and configured to seat against mounting boss face 15 of crosshead 14. The opposite surface 30 of bearing pad 26 is provided with a centrally located concave rounded depression or surface 31 as best shown in FIG. 2 where one jackscrews 22 has been removed for clarity. Bearing surface 31 is configured to smoothly mate with convex bearing surface 25 of jackscrew 22 in order to provide a ball and socket coupling or swivelable mounting connecting the jackscrew to the bearing pad. It will be observed that this arrangement permits the bearing pad to be easily separated from the jackscrew, while insuring that the bearing pad is free to adjust itself to any out-of-squareness of the crosshead boss face 15.

In operation, crosshead nut 16 is threadedly assembled to piston rod 11 in a manner similar to that used with a conventional hex nut 4. Piston rod 11 is then threaded into the threaded crosshead bore 13 and the end clearance of the piston is set to its approximate required value as is well-known in the art. Crosshead nut 16 is then rotated to bring inner surface 17 to within about 0.030 to 0.060 inches of the crosshead mounting boss face 15. Jackscrews 22 are then tightened in a normal alternated sequence to maintain a uniform clearance between crosshead nut 16 and crosshead boss face 15. During the tightening process, the piston end clearance is also checked. It will be observed that the actual clearance, illustrated generally at B in FIG. 3, between crosshead nut 16 and crosshead boss face 15 is not critical, since it is the relative clearances around nut 16 as at B which overcome inherent out-of-squareness of the crosshead.

It will be observed that the use of such multiple jackscrews having hex nut-like caps 24 permits the use of standard socket-type torque wrenches, which can be a tremendous advantage when working in cramped spaces between adjacent compressor cylinders. Furthermore, it is generally recognized that critical fasteners in a piston rod to crosshead mounting must receive a torque which will result in a prestress of that fastener to a 30,000 PSI level in order to maintain a proper relationship with the applied gas and inertia loads to avoid dangerous cyclic stresses in the fastener. Under such conditions, a single conventional crosshead nut 4 such as that illustrated in FIG. 1, which may be a 2¼-8 nut, must be tightened to a 3100 Ft.Lbs. torque value. Assuming the average worker can exert 125 Lbs. force on a wrench, a twenty-four foot wrench handle, or a torque multiplier must be used to achieve this torque value. On the other hand, if six jackscrews 22 are utilized, each having one inch-fourteen studs, a torque wrench with a two foot handle may be used for assembly purposes. Along with smaller tools, another important advantage gained using multiple jackscrew mountings is precise control of the bolting loads, which can be very critical in the highly stressed areas of piston and rod assemblies.

For purposes of an exemplary showing, it is preferred that the total surface area of bearing surfaces 29 of bearing pads 26 equal or exceed the bearing area of the previously used crosshead nut 4. In addition, it is also preferred that the combined thread root area of jackscrew shank portions 23 equals or exceeds the root area of the threaded portion 12 of piston rod 11.

Generally, no rework of the crosshead or rod is required to adapt the multiple jackscrew device to existing equipment, thereby facilitating retrofitting. An adapter plate may also be interposed between the bearing pad and crosshead face to effectively create a larger face 15. It is further preferred that nut 16 will have the first few threads, perhaps ½" in length, relieved as at 40 to allow a larger total stretch of the rod and thereby increase the integrity of the bolted joint.

It will be understood that various changes in the details, materials, steps and arrangements of parts, which have been herein described and illustrated in order to explain the nature of the invention, may be made by those skilled in the art within the principle and scope of the invention as expressed in the appended claims.

The embodiments of the invention in which an exclusive property or privilege is claimed are as follows:

1. A piston rod to crosshead mounting for use in reciprocating compressors having a generally cylindrical piston rod threadedly engaging a crosshead, said mounting comprising:

a crosshead nut including spaced inner and outer faces, a centrally located threaded through bore for threadedly engaging a cooperating threaded portion of the piston rod, and a plurality of threaded spaced bores spaced from and surrounding said through bore; and a jackscrew threadedly engaged in each of said spaced bores, each of said jackscrews including means positioned on one end thereof for tightening said jackscrew to a predetermined torque value and a bearing pad having means swivelably connecting said pad to the other end of said jack screw, said pad having a bearing surface configured to seat against the adjacent crosshead surface, said bearing pad being free to adjust itself to any out-of-squareness of the adjacent crosshead surface.

2. The mounting according to claim 1 wherein said crosshead nut includes a counterbore positioned coaxially with each of said spaced bores adjacent the inner face of said crosshead nut, said bearing pad being positioned within said counterbore.

3. The mounting according to claim 2 including means for securing said bearing pad within said counterbore to permit said pad to adjust to any out-of-squareness of the adjacent crosshead surface.

4. The mounting according to claim 3 wherein said securing means comprises a groove circumferentially inscribed around the outer edge of said bearing pad and a resilient ring secured within said groove such that the outer edge of said ring is in contact with the inner wall of said counterbore.

5. The mounting according to claim 1 wherein said tightening means comprises a nut-like cap.

6. The mounting according to claim 1 wherein said adjacent crosshead surface comprises a smooth surface mounting boss face and said pad bearing surface comprises a flat surface configured to seat against the boss face.

7. The mounting according to claim 1 wherein said connecting means comprises a ball and socket coupling.

8. The mounting according to claim 1 wherein said bearing pad is separate from said jackscrew.

9. The mounting according to claim 8 wherein said connecting means comprises a convex rounded surface formed on said other end of said jackscrew and a concave rounded depression formed in the adjacent surface of said pad and configured to swivelably mate with said convex surface.

10. The mounting according to claim 1 wherein said jackscrews are diametrically opposed.

11. The mounting according to claim 1 including an elongated generally cylindrical piston rod having one end threaded and a crosshead having a threaded central bore for threadedly engaging the threaded end of said piston rod, said crosshead including a substantially flat surfaced mounting boss surrounding said bore and cooperating with the bearing surface of said bearing pads.

12. The mounting according to claim 11 wherein said crosshead nut is positioned such that the inner face of said nut is slightly spaced from said crosshead mounting boss.

* * * * *

UNITED STATES PATENT AND TRADEMARK OFFICE
CERTIFICATE OF CORRECTION

PATENT NO. : 4,338,037
DATED : July 6, 1982
INVENTOR(S) : Richard M. Deminski

It is certified that error appears in the above-identified patent and that said Letters Patent are hereby corrected as shown below:

In the drawings, sheet 2, Fig. 3, the reference numeral 19 should be applied to the threaded bore in nut 16.

In the drawings, sheet 2, Fig. 3, a reference number 15 should be added and applied to the boss face on element 14.

In the drawings, sheet 2, Fig. 3, a reference numeral 40 should be added and applied to the relieved threads in nut 16.

In the drawings, sheet 1, Fig. 2, and in the figure appearing on the first page of the patent, the reference numeral 15 should be applied to the boss face.

Column 3, line 13, should read "in Fig. 2 where one of jackscrews 22 has been removed".

Signed and Sealed this

Twenty-sixth Day of October 1982

[SEAL]

Attest:

GERALD J. MOSSINGHOFF

Attesting Officer

Commissioner of Patents and Trademarks